United States Patent [19]
Miller

[11] Patent Number: 5,948,202
[45] Date of Patent: *Sep. 7, 1999

[54] METHOD FOR REMOVING A PROTECTIVE COATING FROM OPTICAL FIBERS AND MAKING A PHOTONIC DEVICE

[75] Inventor: William J. Miller, Corning, N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/444,983

[22] Filed: May 19, 1995

Related U.S. Application Data

[63] Continuation-in-part of application No. 08/348,542, Dec. 1, 1994, abandoned.

[30] Foreign Application Priority Data

Feb. 3, 1994 [EP] European Pat. Off. ............ 94 400230

[51] Int. Cl.[6] ..................................................... C03B 37/15
[52] U.S. Cl. .............................. 156/344; 65/408; 65/409; 65/411
[58] Field of Search ................................ 156/344, 584; 65/408, 409, 410, 411

[56] References Cited

U.S. PATENT DOCUMENTS

| | | | |
|---|---|---|---|
| 2,636,408 | 4/1953 | Mitchell | 156/344 |
| 4,149,929 | 4/1979 | Ladany . | |
| 4,826,549 | 5/1989 | Pollet et al. | 156/344 |
| 5,298,105 | 3/1994 | Dorsey . | |

FOREIGN PATENT DOCUMENTS

| | | |
|---|---|---|
| 0105960 | 10/1982 | European Pat. Off. . |
| 0190519 | 8/1986 | European Pat. Off. . |
| 2932724 | 5/1980 | Germany . |
| 3718402 | 2/1987 | Germany . |
| 1147503 | 6/1989 | Japan . |
| 60-55303 | 3/1995 | Japan . |
| 102481 | 6/1983 | U.S.S.R. . |
| 2106008 | 4/1983 | United Kingdom . |
| 2207255 | 1/1989 | United Kingdom . |

*Primary Examiner*—Mark A. Osele
*Attorney, Agent, or Firm*—William J. Simmons, Jr.; Philip G. Alden

[57] ABSTRACT

A method and apparatus are provided for removing protective coating material from a fiber optic cable including one or more optical fibers. A stream of hot inert gas is directed onto the cable to soften the protective coating material and blow it from the cable. The stream can be moved relative to the cable until the desired length of coating material has been removed.

26 Claims, 6 Drawing Sheets

METHOD FOR REMOVING A PROTECTIVE COATING FROM OPTICAL FIBERS AND MAKING A PHOTONIC DEVICE

CROSS-REFERENCE TO RELATED APPLICATIONS

This is a continuation-in-part of U.S. patent application Ser. No. 08/348,542 entitled "Method and Apparatus for Stripping Coatings from Optical Fibers" filed on Dec. 1, 1994.

FIELD OF THE INVENTION

The present invention relates to a method and apparatus for removing a coating at a desired position from a fiber optic cable comprising one or more optical fibers embedded in protective coating material.

BACKGROUND OF THE INVENTION

Glass optical fibers have very small diameters and are susceptible to external influences such as mechanical stress and environmental conditions. To protect the fiber from such influences, it is provided with one or more coatings of a of protective material.

Certain uses of optical fibers require that a portion of the coating be removed from an end of the fiber or a portion of the fiber that is remote from the ends. For example, to make a fiber optic coupler, coating is stripped from portions of at least two optical fibers, and the stripped portions are fused together in side-by-side relationship and stretched. In one type of coupler referred to as an overclad coupler, the stripped portions of the fibers are inserted into a tube which is collapsed onto the fibers and stretched. Regardless of how the coupler is made, it is inserted into a protective housing from which fiber pigtails extend for the purpose of connecting the coupler to other optical fibers. It is important that the stripped portions of the fibers do not become weakened during the stripping process since weakened fibers can fail during subsequent process steps or during handling of the coupler when tensile stress is applied to the pigtails.

The process of fusion splicing together two optical fibers or two multi-fiber cables requires that the ends of each pair of fibers that are to be joined be stripped before they are fusion spliced. The spliced portions of the fibers are then recoated. It is increasingly necessary to make splices of reliably high strength.

Therefore, the coating stripping process should not inordinately reduce fiber strength.

Coating can be manually stripped from an optical fiber by placing the fiber within a hand-held tool, bringing blades of the tool into contact with opposite sides of the coating layer, and then moving the tool relative to the axis of the coated optical fiber. The bare portion of the fiber usually needs to be wiped with a cloth wetted with alcohol or the like to remove smudges and/or particles of coating that have been deposited on the bare portion of optical fiber by the coating removal process. This type of coating removal process has been built into equipment that performs the tasks of the technician, whereby the process is no longer manual.

Some coating removal processes employ a solvent such as acetone to soften and swell the coating so that it is more easily removed. Alternatively, a heater within the coating removal apparatus can also cause softening and swelling of the coating. Coating can also be removed by contacting the coated fiber with materials such as sulfuric acid and hydrogen peroxide (to remove a polyester coating) or with sulfuric acid (to dissolve a polysyloxine coating).

These processes have various disadvantages. Processes that are adapted to remove coating only from the end of a coated fiber are often not useful for removing coating from regions remote from the fiber ends, a requirement for making fiber optic couplers. Mechanical strippers can cause scoring or scratching of the fiber surface. For example, the fiber surface can be scratched as the bare glass fiber without its coating is removed from the mechanical stripping device. Some stripping methods do not result in a clean demarcation between the stripped coating and the coating remaining on the fiber. If the stripping process results in a ragged or uneven coating termination, the resultant sripped fiber may not be useful for its intended purpose. Mechanical stripping can also contaminate the fiber surface, thus requiring a subsequent cleaning step to remove particulates. The wiping step can cause more damage to the fiber than the mechanical stripping step. Mechanical stripping that is manually performed is highly operator dependent as it is typically performed with a hand held stripper.

Chemical stripping processes can be disadvantages in that they are difficult to control, and they may leave contaminants or residual coating on the fiber surface. Chemical stripping can also be disadvantages in that it utilizes dangerous caustaic chemicals that need to be handled and disposed of. Moreover, chemicals can flow between the fiber and the coating that remains on the fiber just beyond the stripped region.

It is particularly difficult to remove the coating from an array of optical fibers such as a ribbon cable or a circularly symmetric multi-fiber cable since coating material is situated between closely spaced fibers or between fibers and filamentary strength members in such cables.

SUMMARY OF THE INVENTION

It is therefore an object of the present invention to provide a clean, simple and inexpensive method and apparatus for removing coating from a coated optical fiber or a coated array of fibers. Another object is to provide a method of stripping coating from optical fibers in such a manner that the bare fiber surface is sufficiently clean that it does not have to be further wiped or treated before being used. A further object is to provide a method and apparatus capable of removing coating from the end of an optical fiber, a region of the fiber remote from its ends, or from an entire length of optical fiber.

Briefly, this invention relates to a method for removing coating material from a fiber optic cable including at least one glass optical fiber surrounded by protective coating material. A jet or stream of hot gas is directed onto that portion of the coating material that is to be removed. The composition of the gas is such that it does not react with the coating material. The temperature of the gas is sufficiently high that it softens the coating material, whereby the coating material is blown from the fiber.

In a preferred embodiment, relative movement is provided between the jet and the optical fiber. This can be done by moving the jet, moving the fiber, or moving both the jet and the fiber. If the jet is moved, it can be moved along the axis of the optical fiber and in a direction that is lateral to the axis of the fiber.

It is advantageous to support the fiber such that it is not excessively vibrated by the gas jet.

This invention further relates to apparatus for removing a predetermined length of coating material from a fiber optic cable including at least one glass optical fiber surrounded by protective coating material. The apparatus comprises a source of heated inert gas, the composition of which is such that it does not react with the coating material. Means is provided for directing a jet of the heated gas onto the predetermined length of coated fiber.

BRIEF DESCRIPTION OF THE DRAWINGS

FIG. 5 pertains to a fiber stripped in accordance with the method of this invention. FIG. 6 pertains to a manually stripped and wiped fiber. FIG. 7 pertains to an unstripped fiber.

FIG. 12 schematically illustrates a path that can be followed by a hot gas jet as it removes coating material from a fiber optic cable.

DETAILED DESCRIPTION

Figure 1:
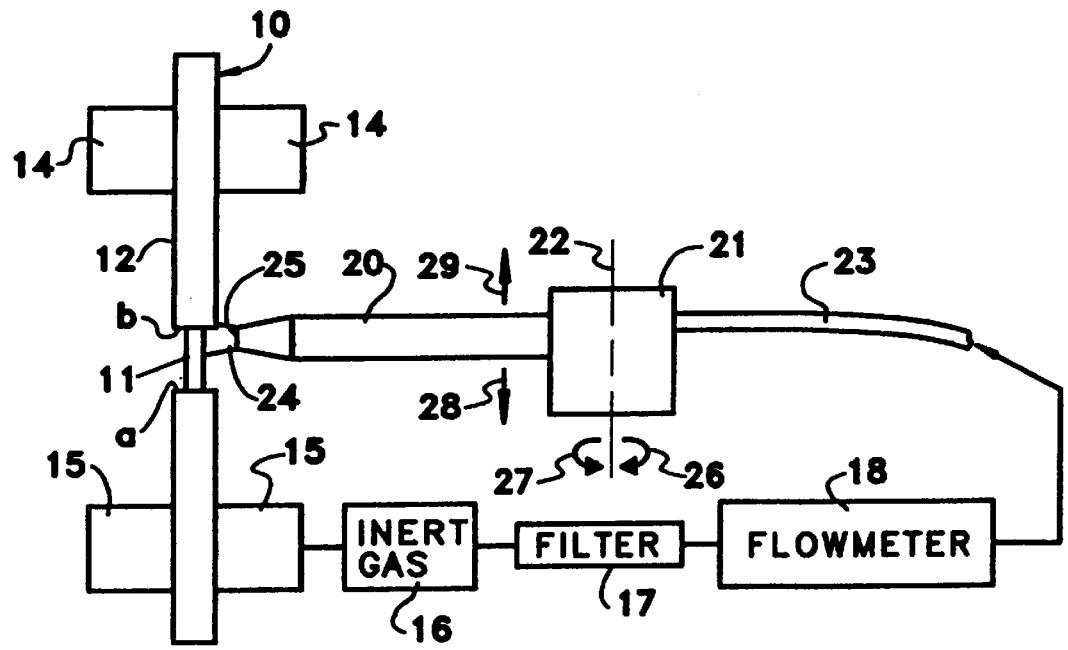
FIG. 1 is a schematic illustration of an apparatus for removing coating material from a coated optical fiber.

FIG. 1 shows an apparatus for removing coating material from coated optical fiber 10 which comprises glass optical fiber 11 and coating 12. The coating composition must be such that it rapidly softens as its temperature is raised. To determine whether a given coating material meets this requirement, a fiber coated with the given material is simply subjected to the method of this invention. Obviously, some coatings, which are formulated so that they are resistant to high temperatures, are unsuitable for use in the present method.

A source 16 of inert gas is supplied through filter 17 and flowmeter 18 to the inlet pipe 23 of a tube heater 20. Heater 20 may consist of an outer tube containing an axial heating element over which the inert gas flows. Other types of gas heaters could be employed. For example, the gas could flow through a separate heating device prior to being delivered to tube 20. The gas emanates from a nozzle 25 that directs the appropriate gas flow onto the fiber. The nozzle can have a relatively small diameter as shown in FIG. 1 to increase gas pressure. Other nozzle designs can be employed to confine the flow to predetermined cross-sectional geometries. For example, a later discussed elongated nozzle directs an oblong cross-section flow onto a relatively long region of coated fiber. The inert gas is one that will not react with the fiber coating material. Examples are nitrogen, argon, helium, carbon dioxide and mixtures thereof. Such gases do not react with the coating layer; moreover, they retard the burning of the coating material. Tube heater 20 is mounted on a support apparatus 21 which is capable of rotating about axis 22 as indicated by arrows 26 and 27 and which is capable of moving along axis 22 as indicated by arrows 28 and 29. Axis 22 may be parallel to the axis of coated fiber 10, but it need not be so oriented.

In one operational mode, coating material 12 is to be removed from coated fiber 10 between points a and b. To prevent hot gas jet 24 from excessively vibrating the fiber, a length of coated optical fiber is held between clamps 14 and 15. Tube heater 20 is positioned along axis 22 so that it rotates in a plane that includes point a along coated fiber 10, but its orientation about axis 22 is such that its output jet 24 is not directed at the fiber. The inert gas valve is opened, and the tube heater is then turned on. After the gas temperature has increased to the operating point, the coating removal process can begin. The tube heater is rotated about axis 22 in the direction of arrow 26 until the hot gas emanating from the tube heater nozzle is directed at point a of coated fiber 10. Tube heater 20 begins to traverse along axis 22 in the direction of arrow 29. After coating material has been removed between points a and b along coated fiber 10, tube heater 20 rotates about axis 22 in the direction of arrow 27 so that hot gas is no longer directed at the fiber. The exposed optical fiber 11 is sufficiently clean that it can be used in processes such as coupler manufacturing or splicing without further treatment.

In an unsuccessful experiment, a jet of hot air was directed onto a coated fiber. Oxygen present in the gas jet reacted with the coating material and caused it to burn and adhere to the fiber surface.

Figure 2:
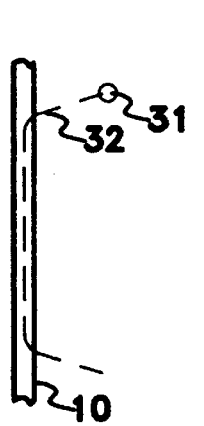
FIGS. 2 and 12 schematically illustrate paths that can be followed by a hot gas jet as it removes coating material from a fiber optic cable.

The hot gas preferably does not dwell on one region of the fiber for too long a time since this could weaken the fiber. For this reason the tube heater preferably begins to traverse along axis 22 as soon as it swings into the position where hot gas is directed onto the coated fiber. The path of the inert gas jet could be as illustrated in FIG. 2. The tube heater can simultaneously rotate (arrow 26) and move upwardly (arrow 29) until gas jet 31 is directed onto coated fiber 10. After the removal of sufficient coating material, it can rotate (arrow 27) while still moving upwardly (arrow 29). This generates a path 32 as shown in FIG. 2.

Figure 3:
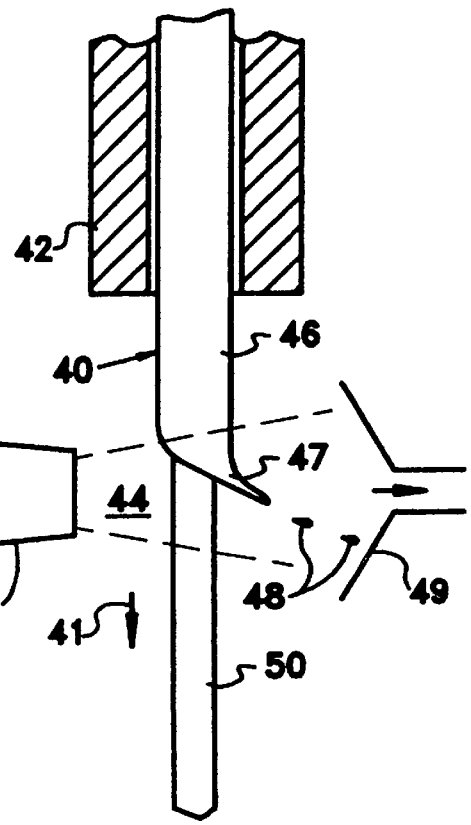
FIGS. 3 and 4 are schematic illustrations of further fiber coating removing techniques.

The arrangement shown in FIG. 3 can be employed to remove coating material from the end of a coated fiber 40. As shown by arrow 41 the coated fiber is fed through a tube 42 having an inside diameter only slightly larger than the outside diameter of the coated fiber The nozzle 43 of tube heater 45 is located near the point of exit of the fiber from tube 42 to minimize the amount of fiber vibration due to the gas jet 44 impinging on the fiber. The tube heater is rotatable as described in conjunction with FIG. 1 so that jet 44 can be directed away from fiber 50. Nozzle 43 is initially directed toward the axis of coated fiber 40. As the coated fiber emerges from tube 42, and into the path of jet 44, coating material 46 becomes softened by the hot gas, and small particles 48 of the coating material are blown from optical fiber 50 and into exhaust vent 49. A tail 47, which may remain after the stripping process, is sufficiently small that it does not interfere with subsequent processes in which the fiber is used.

The speed with which relative motion occurs between the coated fiber and the gas jet depends upon parameters such as the gas temperature, the gas flow rate, the rate at which the gas jet traverses the coated fiber, and the softening characteristics of the particular coating material. These parameters are interdependent. If, for example, the temperature of the jet were to increase from a first temperature to a second temperature, the relative motion between jet and fiber should increase from a first rate to a second rate to obtain a result similar to that obtained for the first temperature and first rate.

Figure 4:
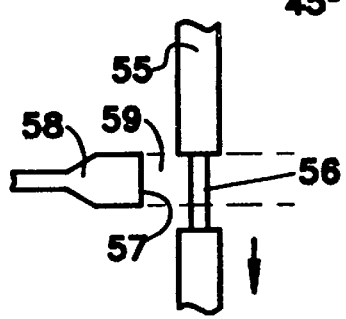

FIG. 4 illustrates a technique for rapidly removing coating 55 from optical fiber 56. This technique might be employed for removing coating from a long length of fiber, perhaps an entire reel of fiber. Nozzle 57 of heater tube 58 is elongated so that it is capable of directing a stream 59 of hot inert gas to a relatively long section of coating.

An elongated nozzle, such as that shown in FIG. 4, could also be used to remove coating without providing any relative movement between nozzle and fiber. The length of the nozzle would be predetermined so that the jet would impinge upon the fiber and remove a predetermined length. It would probably be desirable to employ a relatively high temperature, high flow gas jet in the absence of relative jet/fiber movement.

EXAMPLE 1

Removing Coating from Single Fiber

The coated optical fiber employed in this example was a conventional silica-based single-mode optical fiber having an outside diameter of 125 μm. The optical fiber was provided with a urethane acyrlate coating having an outside diameter of 250 μm. A Convectronics Model 001-10002 tube heater was employed. The diameter of the outlet end of the nozzle was 1.76 mm. A thermocouple was temporarily located within the tube heater near the outlet end to calibrate the temperature of the inert gas exiting the tube as a function of voltage applied to the heating element. For the present example, an ac voltage of 126.7 volts was applied to the heater tube; this resulted in a measured gas temperature of about 820° C. The distance between the outlet end of tube heater 20 and the coated fiber during the fiber stripping operation was about 2.86 mm. Nitrogen flowed at a rate of 20.9 standard liters per minute into inlet pipe 23.

The flow of nitrogen was initiated, and voltage was supplied to the heater tube. Following the procedure outlined in conjunction with FIG. 3, the coated optical fiber was fed from the delivery tube 42 at a rate of 1.75 cm/sec. Nozzle 43 was located about 2.5 mm below the bottom tip of the delivery tube. Coating material was softened and blown from the end of the fiber as it moved past the hot nitrogen jet emanating from the heater tube. After the coating was removed from a 25.4 mm length of the coated optical fiber, the jet was rotated so that it no longer impinged on the coating.

Figure 5:
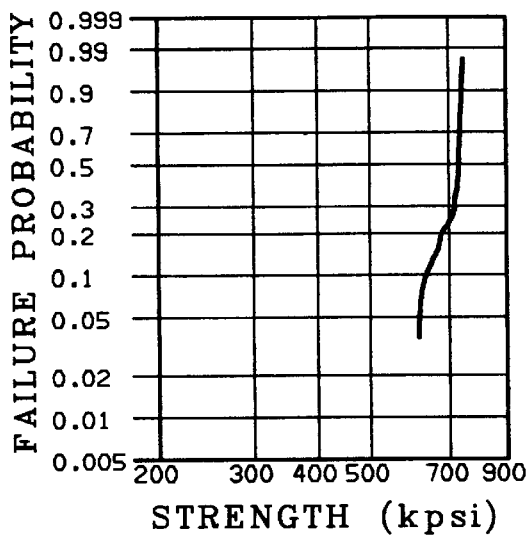
FIGS. 5, 6 and 7 are cumulative Weibull probability plots for three different fibers.
Figure 6:
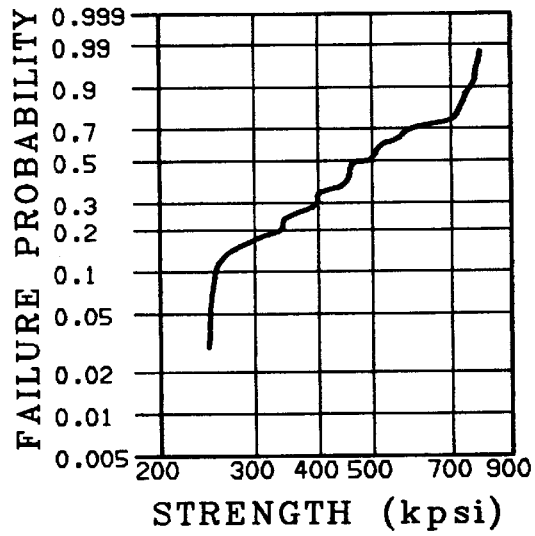

The resultant stripped fiber was subjected to strength testing. The cumulative Weibull probability plot for the fiber is shown in FIG. 5. This fiber was stronger than manually stripped fiber which needed to be wiped with alcohol to remove from the stripped fiber particulates that remained from the stripping operation. A Weibull plot of manually stripped and wiped fiber is shown in FIG. 6. It is noted that manual stripping is the conventionally employed technique for removing coating material from optical fibers to prepare them for use in the overclad coupler manufacturing process.

Figure 7:
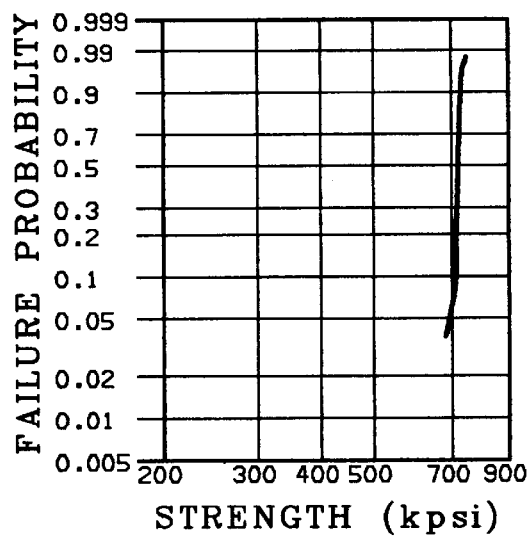

For comparison purposes, a Weibull plot for an unstrapped (coated) optical fiber is shown in FIG. 7. The strength of a fiber stripped in accordance with this invention (FIG. 5) is much closer to the strength of an unstrapped fiber (FIG. 7) than a manually stripped fiber (FIG. 6).

Optical fiber stripped by the method of Example 1 can be employed to make a fiber optic coupler without any further cleaning step. When making overclad couplers, for example, a portion of the coating is removed from each of a plurality of optical fibers, and the uncoated or stripped portions of the fibers are inserted into the longitudinal bore of a glass tube such that the ends of each fiber extend beyond one or both of the ends of the tube. The midregion of the resultant coupler preform is heated to collapse it around the fibers, and the central portion of the midregion is stretched to elongate the fibers and reduce their diameter. Stretching is discontinued when the desired coupling has been achieved. If any coating material in the form of smears or particles remains on the stripped fiber when it is inserted into the glass tube, the coating material will burn or decompose during the tube collapse and stretch steps. Gas generated by this burning process forms seeds that cause unacceptable levels of excess loss in the resultant couplers. Couplers made from fibers stripped in accordance with this invention exhibit low loss and no seeds.

The method of this invention is not limited to those parameters which have been set forth in Example 1. There is a wide range of settings for gas flow, gas temperature, and relative movement between heater tube and optical fiber or fibers. The coating has been removed from an optical fiber with reasonable effectiveness at gas temperatures as low as about 550° C. If such lower gas temperatures are used, the relative movement between heater tube and optical fiber must decrease in order to achieve sufficient heating to soften the coating material. Alternatively, an elongated nozzle could be employed as shown in FIG. 4. However, gas flow must be sufficient to blow the softened coating material from the fiber.

Figure 8:
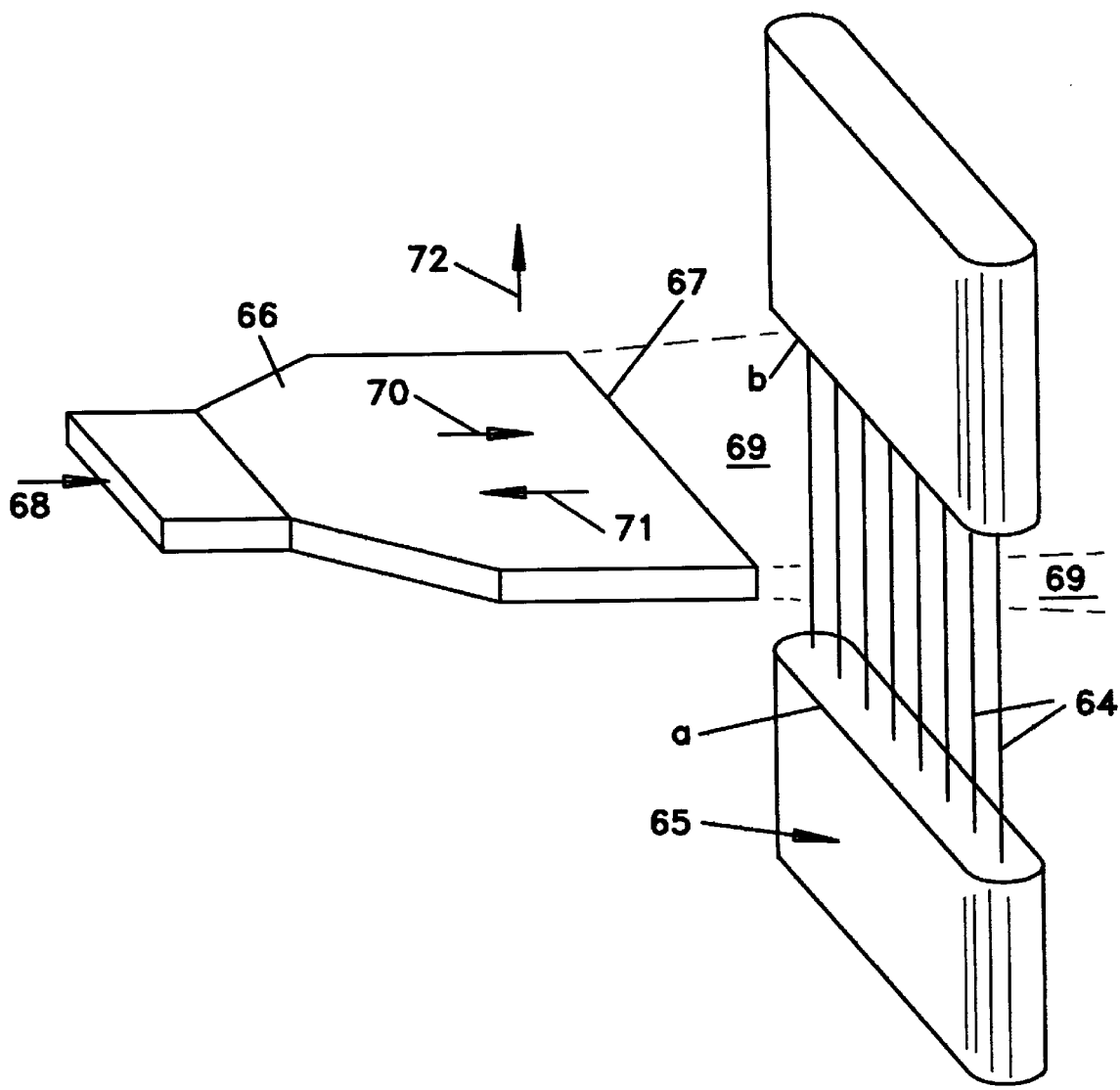
FIG. 8 illustrates the removal of coating material from a ribbon cable.

FIG. 8 illustrates the manner in which the coating can be removed from the optical fibers of a ribbon cable 65. Gas (arrow 68), which is fed to heater 66, issues from nozzle 67 as a stream 69 that encompasses the entire width of ribbon cable 65. Since nozzle 67 is rectangularly-shaped, the shape of stream 69 in a plane perpendicular to the direction of stream flow is oblong. As in FIG. 1, heater 66 (in a position lower than that illustrated) can move in the direction of arrow 70 until the hot inert gas stream 69 is directed onto cable 65 at region a. Heater 66 moves along cable 65 in the direction of arrow 72. After coating material has been removed between points a and b along cable 65, heater 66 retracts from cable 65 in the direction of arrow 71 until hot gas is no longer directed at the cable. The exposed optical fibers 64 are sufficiently clean that they can be subjected to further process steps without further treatment. Whereas FIG. 8 shows the removal of coating from a middle region of cable 65, the apparatus of FIG. 8 could also be employed for removing coating from the end of a ribbon cable.

Figure 9:
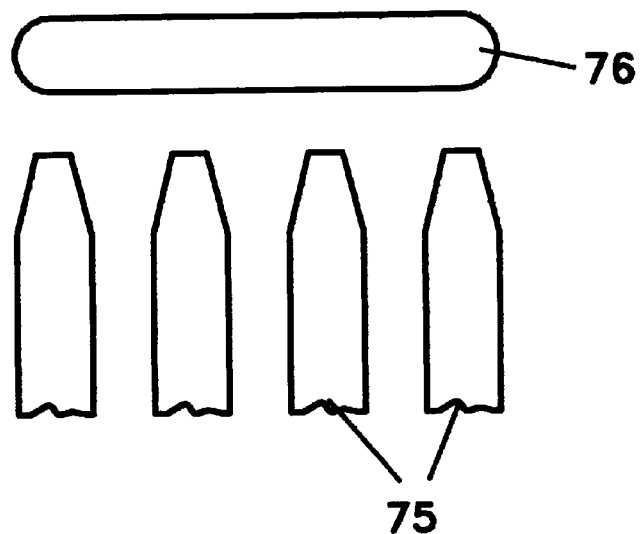
FIGS. 9 and 11 shows apparatus for directing a plurality of jets of hot gas onto a fiber optic cable.

As shown in FIG. 9 heater tubes 75 can be used to direct a plurality of jets of hot gas onto a cable 76. This embodiment would be useful for removing coating from a ribbon cable the width of which is such that a large amount of heat would be required to soften its coating.

Figure 10:
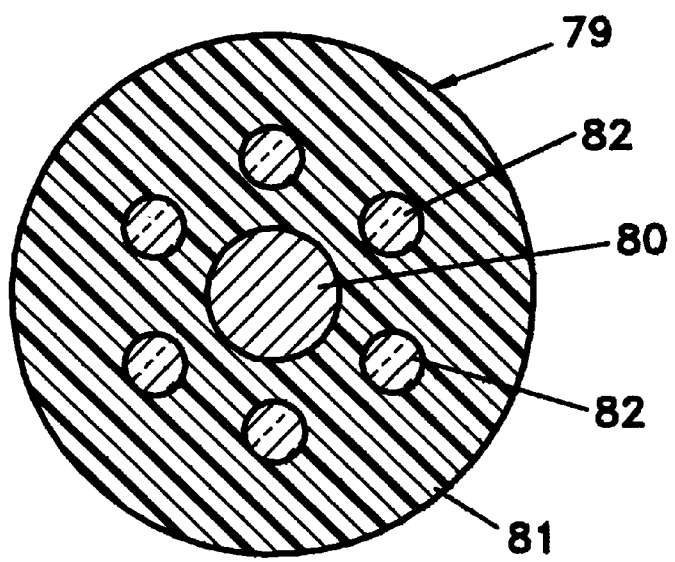
FIG. 10 is a cross-sectional view of a fiber optic cable.

The method of the present invention can also be employed to strip the coating from the end or a middle region of a circularly symmetric fiber optic cable such as that shown in FIG. 10. Cable 79 includes a tension member 80 surrounded by plastic coating material 81, a plurality of optical fibers 82 being equally spaced around member 80. Such cables are conventionally formed of a plurality of layers of coating material. Only a single mass 81 of coating material is illustrated for the sake of simplicity. One or more hot gas jets can be directed onto cable 79 to completely remove coating material from an end or middle region therefrom even though such material is located between closely spaced fibers as well as between the tension member and the fibers.

Figure 11:
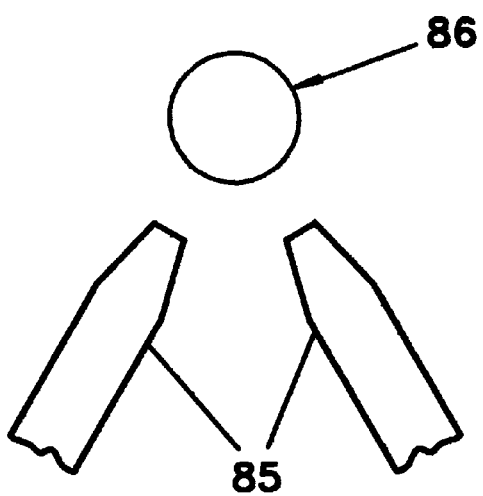

FIG. 11 shows that two or more heater tubes 85 can be directed radially inwardly toward the longitudinal axis of optical transmission means 86 which may comprise a single coated optical fiber or a cable containing a plurality of fibers.

Figure 12:
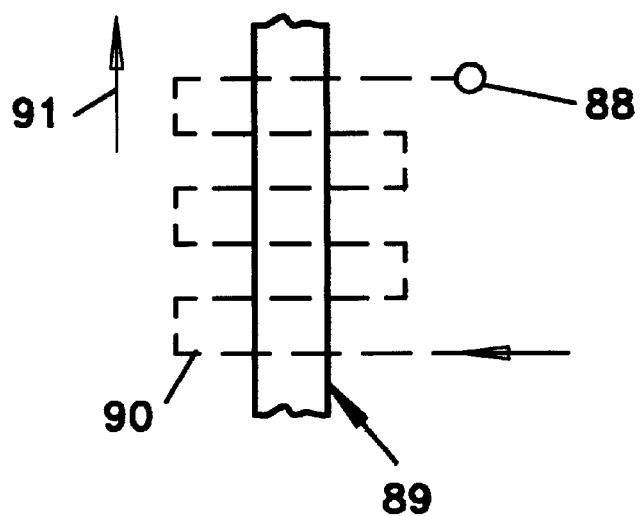

FIG. 12 illustrates a path 90 that could be followed by a hot inert gas jet 88 as it removes coating material from an optical transmission means 89 which may comprise a coated fiber or a multi-fiber cable. In this embodiment the stream reciprocatingly moves across the cable while there is relative axial movement between the cable and the stream. The path of jet movement is as follows:

(a) the jet is directed to one side of cable 89, (b) the jet is scanned across the cable, (c) the jet is moved along the cable in the direction of arrow 91, (d) the jet is scanned across the cable, and (e) steps (c) and (d) are repeated until the desired length of coating material is removed.

The resultant path is represented by dashed line 90.

Figure 13:
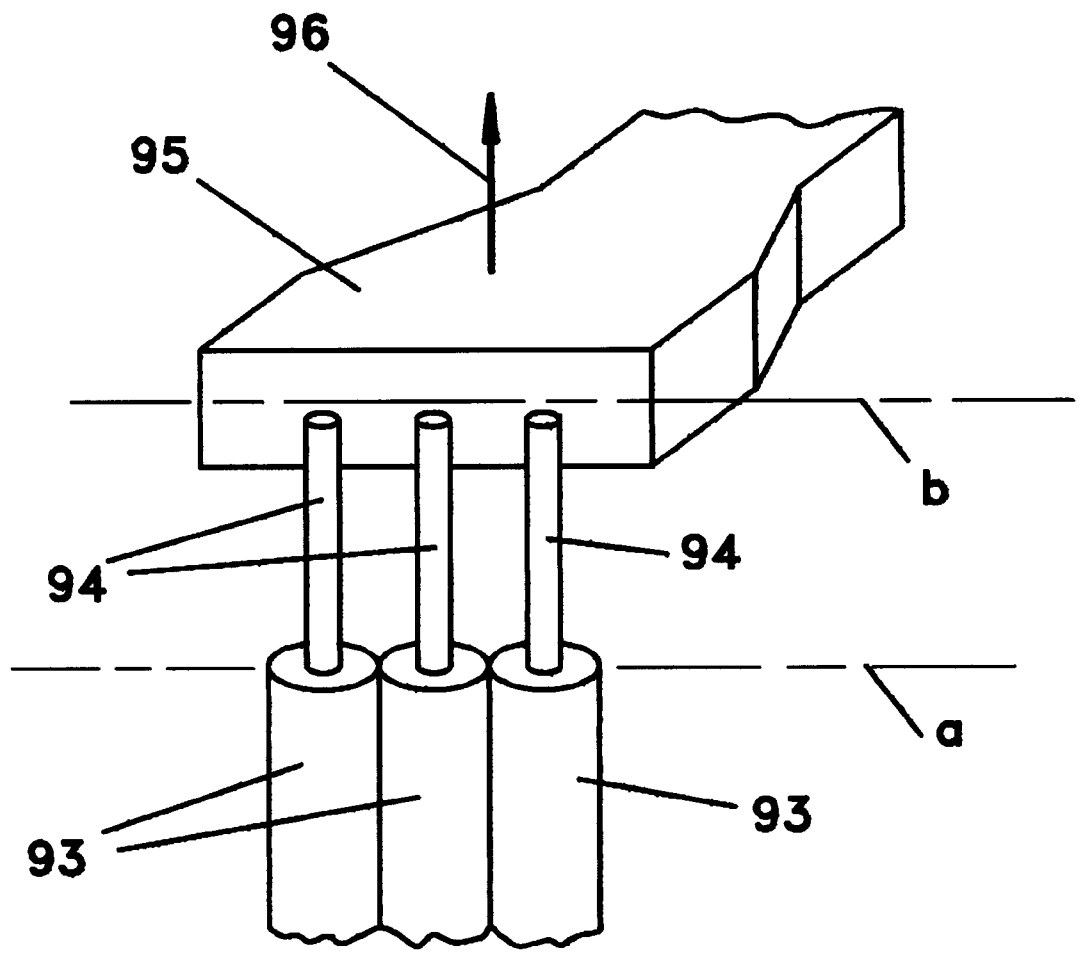
FIG. 13 illustrates the removal of coating material from a plurality of individual optical fibers.

FIG. 13 illustrates that coating material 93 can be simultaneously removed from a plurality of individual optical fibers 94 by directing nozzle 95 so that hot inert gas flows toward region a of the fibers. The nozzle is then moved toward region b (the fiber ends in this figure). This technique can be used to prepare a plurality of optical fibers for splicing or for use in a coupler. The coating material could also be removed from a central region of each of a plurality of fibers by this technique. Instead of arranging the fibers in a linear array as shown in FIG. 13, they could be grouped in a circular array or some other nonlinear arrangement.

I claim:

1. A method for removing a protective coating material from a portion of a fiber optic cable in preparation for fabricating a photonic assembly, said fiber optic cable including a glass optical fiber having an outer surface surrounded by said protective coating material, said protective coating material having an entire thickness measured relative to said outer surface of said glass optical fiber, said glass optical fiber having a requisite optical transmission quality and a predetermined strength characteristic, said method comprising the step of:

directing a stream of a hot inert gas at a predetermined velocity onto the protective coating material that is to be removed, said hot inert gas having a composition that does not react adversely with the protective coating material, the temperature of said hot inert gas being sufficiently high to soften the protective coating material without damaging outer surface of the optical glass fiber, said predetermined velocity and said temperature of said stream of hot inert gas both being sufficient to remove the entire thickness of the protective coating material from the outer surface of the glass optical fiber so as to leave the outer surface of the glass optical fiber exposed and substantially free of particles and residue of the protective coating material along the portion of the glass optical fiber from which the protective coating material was removed, such that the outer surface of the glass optical fiber retains the requisite optical transmission quality along the outer surface thereof and the predetermined strength characteristic is not significantly decreased.

2. The method of claim 1 wherein the temperature of said gas is at least 550° C., and the method further comprises the step of:

providing relative movement between the stream of the hot inert gas and the fiber optic cable.

3. The method of claim 2 wherein the fiber optic cable has a longitudinal axis and the step of providing relative movement comprises:

moving the stream of the hot inert gas along the longitudinal axis of the fiber optic cable in a direction that is lateral to the axis of the fiber optic cable.

4. The method of claim 3 wherein the stream of the hot inert gas moves laterally with respect to the fiber optic cable until the stream impinges upon the fiber optic cable, the stream then moves along the longitudinal axis of the fiber optic cable for a predetermined distance, and the stream then moves laterally with respect to the fiber optic cable until the stream no longer impinges upon the fiber optic cable.

5. The method of claim 2 wherein the stream of the hot inert gas moves laterally with respect to the fiber optic cable until the stream impinges upon the fiber optic cable, the stream then moves along the longitudinal axis of the fiber optic cable for a predetermined distance, and the stream then moves laterally with respect to the fiber optic cable until the stream no longer impinges upon the fiber optic cable.

6. The method of claim 2 wherein the step of providing relative movement comprises:

maintaining the stream stationary and moving the fiber optic cable relative to the stream.

7. The method of claim 1 wherein the stream moves reciprocatingly across the fiber optic cable while there is axial movement between the fiber optic cable and the stream.

8. The method of claim 1 wherein the stream of the hot inert gas has a direction of flow and a cross-section in a direction generally perpendicular to said direction of flow, said cross-section being generally oblong.

9. The method of claim 8 wherein the fiber optic cable includes a plurality of glass optical fibers.

10. The method of claim 1 wherein the fiber optic cable includes a plurality of individual glass optical fibers disposed in a side-by-side relationship, and the protective coating material is simultaneously removed from said plurality of individual glass optical fibers.

11. The method of claim 1 wherein the steps are performed without wiping the outer surface of the glass optical fiber subsequent to removing the protective coating material therefrom.

12. A method for making a photonic device from a fiber optic cable and having a first optical fiber with an optical transmission quality for a light signal, an outer surface, and a protective coating material surrounding a portion of said outer surface of said first optical fiber, and a second optical fiber, said protective coating material having an entire thickness measured relative to said outer surface of said first optical fiber, said method comprising the steps of:

directing a stream of a hot inert gas at a predetermined velocity onto the portion of the protective coating material surrounding the first optical fiber, said hot inert gas having a composition that does not react with the protective coating material, the temperature of said hot inert gas being sufficiently high to soften the protective coating material without damaging the outer surface of the first optical fiber, said predetermined velocity and said temperature of said stream of hot inert gas both being sufficient to remove the entire thickness of the protective coating material from the outer surface of the first optical fiber so as to leave the outer surface of the first fiber exposed and substantially free of particles or residue from the protective coating material along the portion of the first optical fiber from which the protective coating material was removed, such that the outer surface of the first optical fiber retains the optical transmission quality along the outer surface thereof;

disposing the first optical fiber in close proximity to the second optical fiber such that the outer surface of the first optical fiber is generally parallel with and closely adjacent to the outer surface of the second optical fiber; and optically coupling the first optical fiber to the second optical fiber such that a useful portion of the light signal is transmitted from the first optical fiber to the second optical fiber.

13. The method of claim 12 wherein the photonic device is an optical coupler.

14. The method of claim 13 wherein the second optical fiber has an outer surface, and further wherein optical coupler is of the type in which the first optical fiber and the second optical fiber are disposed in a generally parallel, side-by-side relationship to one another with the outer surface of the first optical fiber in close confronting contact with said outer surface of the second optical fiber.

15. The method of claim 14 wherein the step of optically coupling the first optical fiber to the second optical fiber further comprises:

fusing the first optical fiber to the second optical fiber to form a generally monolithic structure.

16. The method of claim 15 wherein the step of optically coupling the first optical fiber to the second optical fiber further comprises:

drawing the first optical fiber and the second optical fiber.

17. The method of claim 16 wherein the step of optically coupling the first optical fiber to the second optical fiber further comprises:

placing an outer tube surrounding the first optical fiber and the second optical fiber before the first optical fiber and the second optical fiber are fused and drawn, such that said outer tube is in close confronting contact with the outer surface of at least one of the first optical fiber or the second optical fiber or both, and the outer tube is fused to and drawn with the first optical fiber and the second optical fiber or both to form a generally monolithic structure.

18. The method of claim 12 wherein the temperature of said gas is at least 550° C., and the method further comprises the step of:

providing relative movement between the stream of the hot inert gas and the fiber optic cable.

19. The method of claim 18 wherein the fiber optic cable has a longitudinal axis and the step of providing relative movement comprises:

moving the stream of the hot inert gas along the longitudinal axis of the fiber optic cable in a direction that is lateral to the axis of the fiber optic cable.

20. The method of claim 19 wherein the stream of the hot inert gas moves laterally with respect to the fiber optic cable until the stream impinges upon the fiber optic cable, the stream then moves along the longitudinal axis of the fiber optic cable for a predetermined distance, and the stream then moves laterally with respect to the fiber optic cable until the stream no longer impinges upon the fiber optic cable.

21. The method of claim 18 wherein the stream of the hot inert gas moves laterally with respect to the fiber optic cable until the stream impinges upon the fiber optic cable, the stream then moves along the longitudinal axis of the fiber optic cable for a predetermined distance, and the stream then moves laterally with respect to the fiber optic cable until the stream no longer impinges upon the fiber optic cable.

22. The method of claim 18 wherein the step of providing relative movement comprises:

maintaining the stream stationary and moving the fiber optic cable relative to the stream.

23. The method of claim 12 wherein the stream moves reciprocatingly across the fiber optic cable while there is axial movement between the fiber optic cable and the stream.

24. The method of claim 12 wherein the stream of the hot inert gas has a direction of flow and a cross-section in a direction generally perpendicular to said direction of flow, said cross-section being generally oblong.

25. The method of claim 12 wherein the fiber optic cable includes a plurality of individual optical fibers disposed in a side-by-side relationship, and the protective coating material is simultaneously removed from said plurality of individual optical fibers.

26. The method of claim 12 wherein the steps are performed without wiping the outer surface of the first optical fiber subsequent to removing the protective coating material therefrom.

* * * * *